(12) United States Patent
Abraham et al.

(10) Patent No.: US 9,645,224 B2
(45) Date of Patent: May 9, 2017

(54) PROCESSING OF GEO-SPATIAL ATHLETICS SENSOR DATA

(71) Applicants: Torsten Abraham, Heidelberg (DE); Florian Foebel, Buerstadt (DE); Boris Gruschko, Ziegelhausen (DE); Gerrit Simon Kazmaier, Heidelberg (DE); Christian Lahmer, Heidelberg (DE); Nico Licht, Heidelberg (DE); Marcus Lieberenz, Mannheim (DE); Lars Volker, Karlsruhe (DE)

(72) Inventors: Torsten Abraham, Heidelberg (DE); Florian Foebel, Buerstadt (DE); Boris Gruschko, Ziegelhausen (DE); Gerrit Simon Kazmaier, Heidelberg (DE); Christian Lahmer, Heidelberg (DE); Nico Licht, Heidelberg (DE); Marcus Lieberenz, Mannheim (DE); Lars Volker, Karlsruhe (DE)

(73) Assignee: SAP SE, Walldorf (DE)

( * ) Notice: Subject to any disclaimer, the term of this patent is extended or adjusted under 35 U.S.C. 154(b) by 204 days.

(21) Appl. No.: 14/219,927

(22) Filed: Mar. 19, 2014

(65) Prior Publication Data
US 2015/0265876 A1    Sep. 24, 2015

(51) Int. Cl.
*A63F 13/00*    (2014.01)
*G01S 5/00*    (2006.01)
*G01S 19/19*    (2010.01)

(52) U.S. Cl.
CPC ............ *G01S 5/0027* (2013.01); *G01S 19/19* (2013.01)

(58) Field of Classification Search
CPC . A61B 5/0002; A61B 5/6814; A63B 2208/12; A43B 3/00
See application file for complete search history.

(56) References Cited

U.S. PATENT DOCUMENTS

| | | | | |
|---|---|---|---|---|
| 7,052,391 | B1 * | 5/2006 | Luciano, Jr. ....... | A63B 24/0021 463/28 |
| 2003/0054905 | A1 * | 3/2003 | King, Jr. ............ | A63B 24/0021 473/467 |
| 2010/0030350 | A1 * | 2/2010 | House ................ | A63B 24/0021 700/91 |
| 2013/0046559 | A1 | 2/2013 | Coleman et al. | |
| 2013/0128022 | A1 | 5/2013 | Bose et al. | |
| 2014/0019119 | A1 | 1/2014 | Liu et al. | |
| 2014/0100900 | A1 | 4/2014 | Abhyanker | |
| 2015/0178972 | A1 | 6/2015 | Barcay et al. | |
| 2015/0268929 | A1 | 9/2015 | Abraham et al. | |

\* cited by examiner

*Primary Examiner* — Reginald Renwick
(74) *Attorney, Agent, or Firm* — Mintz Levin Cohn Ferris Glovsky and Popeo, P.C.

(57) ABSTRACT

Correlated and processed data is received that is derived from a plurality of geo-spatial sensors that respectively generate data characterizing a plurality of sources within a zone of interest. The data includes a series of time-stamped frames for each of the sensors. Subsequently, events of interest are identified, in real-time, based on relative positions of the sources within the zone of interest prior to the data being written to a data storage application. Data can then be provided (e.g., loaded, stored, displayed, transmitted, etc.), in real-time, that characterize the events of interest. Related apparatus, systems, techniques and articles are also described.

18 Claims, 11 Drawing Sheets

PROCESSING OF GEO-SPATIAL ATHLETICS SENSOR DATA

TECHNICAL FIELD

The subject matter described herein relates to processing of geo-spatial data derived from a plurality of sensors persisted in a real-time analytics platform for various applications including athletics.

BACKGROUND

Sensor arrays are increasingly being used to characterize motion and position of objects within a zone of interest. These sensors can include one or more of accelerometers, gyroscopes, magnetic sensors, pressure sensors, GPS, and the like to characterize position and/or relative motion of an object to which the sensor is affixed. In addition, these sensors are increasingly compact in size, low power, and transmit data wirelessly, which collectively allow the sensors to be used in a wide variety of applications including athletics.

SUMMARY

In one aspect, correlated and processed data is received that is derived from a plurality of geo-spatial sensors that respectively generate data characterizing a plurality of sources within a zone of interest. The data includes a series of time-stamped frames for each of the sensors. Subsequently, events of interest are identified, in real-time, based on relative positions of the sources within the zone of interest prior to the data being written to a data storage application. Data can then be provided (e.g., loaded, stored, displayed, transmitted, etc.), in real-time, that characterize the events of interest.

The sources can include athletes and at least one athletic equipment item (e.g., a ball, puck, stick, etc.). It can be determined, among a plurality of balls, which ball is active. It can be determined which of two or more teams has possession of the ball. The events of interest can include goals. The events of interest can include kicks on goal. The events of interest can include passes from a first player to a second player. The events of interest can include an interception of a ball from a player from a first team by a player from a second team. The events of interest include scoring events in an athletic events and relative positions of among the sources.

The events of interest can include a first player on a first team covering a second player on a second team. An outer boundary of coverage of the first player in relation to the second player can be determined.

The data storage application can be an in-memory database. The in-memory database can include a columnar data store storing data in a columnwise-fashion.

Non-transitory computer program products (i.e., physically embodied computer program products) are also described that store instructions, which when executed on one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The subject matter described herein provides many advantages. For example, the current subject matter enables data derived from geo-spatial sensors to be efficiently processed and analyzed using a real-time analytics platform such as the SAP HANA platform for various applications such as athletics (e.g., soccer, etc.).

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

Figure 1:
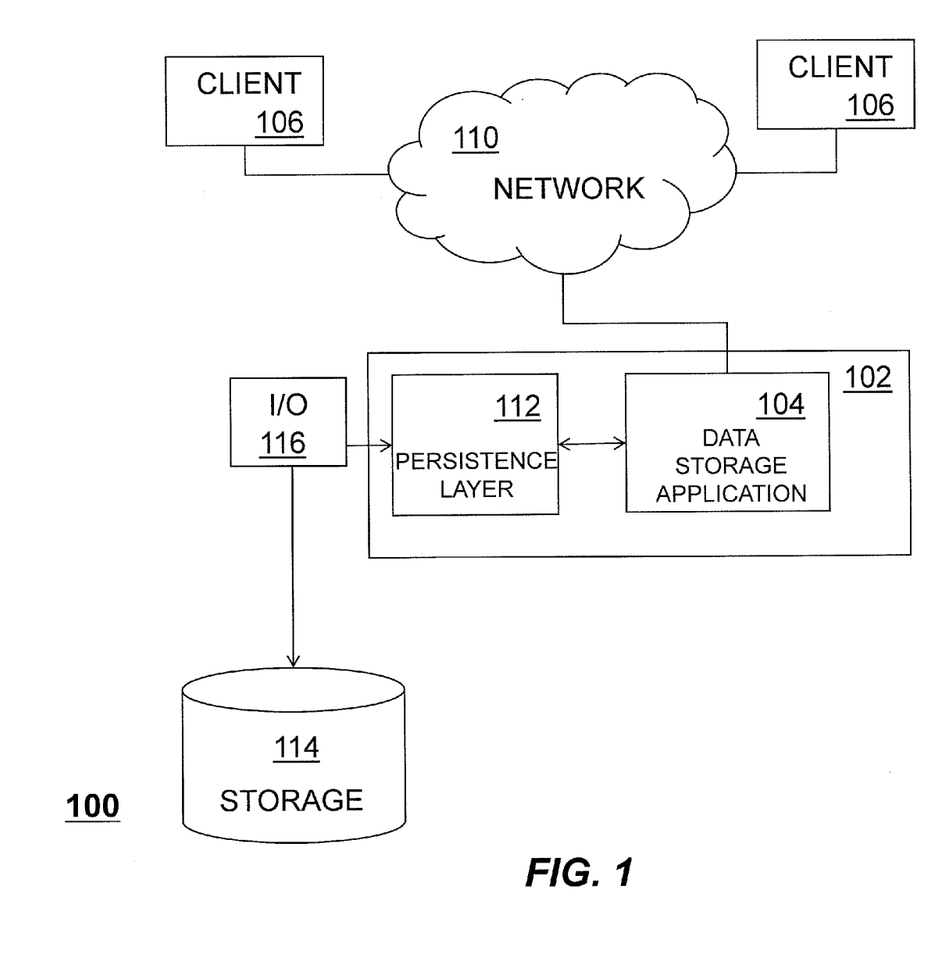
FIG. 1 is a diagram illustrating a system including a data storage application.
Figure 2:
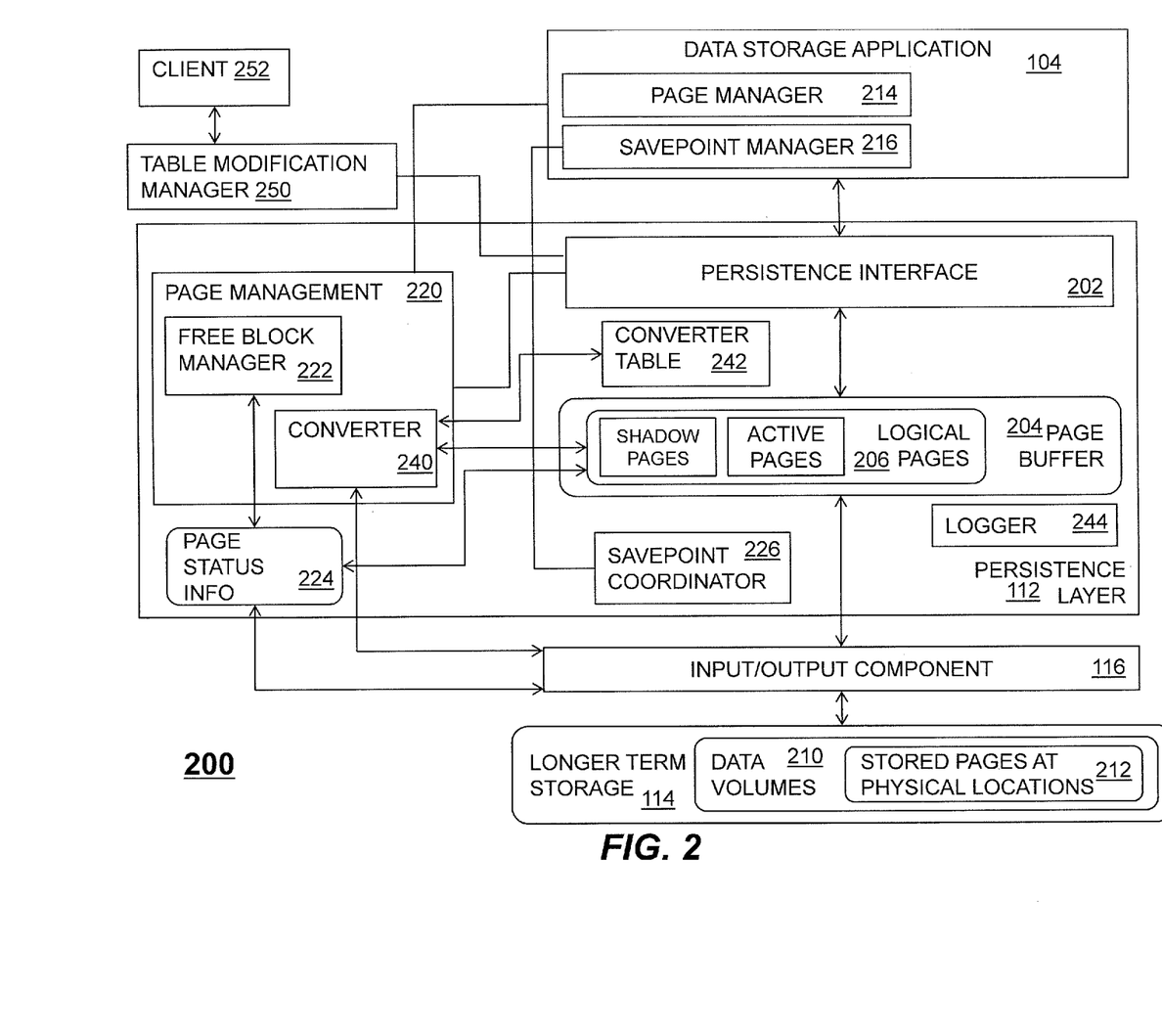
FIG. 2 is a diagram illustrating details of the system of FIG. 1.

FIGS. 1 and 2 are diagrams providing an example environment for implementing the subject matter described herein. It will be appreciated that other environments can be utilized including variations of the environments illustrated in FIGS. 1 and 2. In particular, FIG. 1 shows an example of a system 100 in which a computing system 102, which can include one or more programmable processors that can be collocated, linked over one or more networks, etc., executes one or more modules, software components, or the like of a data storage application 104. The data storage application 104 can include one or more of a database, an enterprise resource program, a distributed storage system (e.g. NetApp Filer available from NetApp of Sunnyvale, Calif.), or the like.

The one or more modules, software components, or the like can be accessible to local users of the computing system 102 as well as to remote users accessing the computing system 102 from one or more client machines 106 over a network connection 110. One or more user interface screens produced by the one or more first modules can be displayed to a user, either via a local display or via a display associated with one of the client machines 106. Data units of the data storage application 104 can be transiently stored in a persistence layer 112 (e.g. a page buffer or other type of temporary persistency layer), which can write the data, in the form of storage pages, to one or more storages 114, for example via an input/output component 116. The one or more storages 114 can include one or more physical storage media or devices (e.g. hard disk drives, persistent flash memory, random access memory, optical media, magnetic media, and the like) configured for writing data for longer term storage. It should be noted that the storage 114 and the input/output component 116 can be included in the computing system 102 despite their being shown as external to the computing system 102 in FIG. 1.

Data retained at the longer term storage 114 can be organized in pages, each of which has allocated to it a defined amount of storage space. In some implementations, the amount of storage space allocated to each page can be constant and fixed. However, other implementations in which the amount of storage space allocated to each page can vary are also within the scope of the current subject matter.

FIG. 2 shows a software architecture 200 consistent with one or more features of the current subject matter. A data storage application 104, which can be implemented in one or more of hardware and software, can include one or more of a database application, a network-attached storage system, or the like. According to at least some implementations of the current subject matter, such a data storage application 104 can include or otherwise interface with a persistence layer 112 or other type of memory buffer, for example via a persistence interface 202. A page buffer 204 within the persistence layer 112 can store one or more logical pages 206, and optionally can include shadow pages, active pages, and the like. The logical pages 206 retained in the persistence layer 112 can be written to a storage (e.g. a longer term storage, etc.) 114 via an input/output component 116, which can be a software module, a sub-system implemented in one or more of software and hardware, or the like. The storage 114 can include one or more data volumes 210 where stored pages 212 are allocated at physical memory blocks.

In some implementations, the data storage application 104 can include or be otherwise in communication with a page manager 214 and/or a savepoint manager 216. The page manager 214 can communicate with a page management module 220 at the persistence layer 112 that can include a free block manager 222 that monitors page status information 224, for example the status of physical pages within the storage 114 and logical pages in the persistence layer 112 (and optionally in the page buffer 204). The savepoint manager 216 can communicate with a savepoint coordinator 226 at the persistence layer 204 to handle savepoints, which are used to create a consistent persistent state of the database for restart after a possible crash.

In some implementations of a data storage application 104, the page management module of the persistence layer 112 can implement a shadow paging. The free block manager 222 within the page management module 220 can maintain the status of physical pages. The page buffer 204 can included a fixed page status buffer that operates as discussed herein. A converter component 240, which can be part of or in communication with the page management module 220, can be responsible for mapping between logical and physical pages written to the storage 114. The converter 240 can maintain the current mapping of logical pages to the corresponding physical pages in a converter table 242. The converter 240 can maintain a current mapping of logical pages 206 to the corresponding physical pages in one or more converter tables 242. When a logical page 206 is read from storage 114, the storage page to be loaded can be looked up from the one or more converter tables 242 using the converter 240. When a logical page is written to storage 114 the first time after a savepoint, a new free physical page is assigned to the logical page. The free block manager 222 marks the new physical page as "used" and the new mapping is stored in the one or more converter tables 242.

The persistence layer 112 can ensure that changes made in the data storage application 104 are durable and that the data storage application 104 can be restored to a most recent committed state after a restart. Writing data to the storage 114 need not be synchronized with the end of the writing transaction. As such, uncommitted changes can be written to disk and committed changes may not yet be written to disk when a writing transaction is finished. After a system crash, changes made by transactions that were not finished can be rolled back. Changes occurring by already committed transactions should not be lost in this process. A logger component 344 can also be included to store the changes made to the data of the data storage application in a linear log. The logger component 244 can be used during recovery to replay operations since a last savepoint to ensure that all operations are applied to the data and that transactions with a logged "commit" record are committed before rolling back still-open transactions at the end of a recovery process.

With some data storage applications, writing data to a disk is not necessarily synchronized with the end of the writing transaction. Situations can occur in which uncommitted changes are written to disk and while, at the same time, committed changes are not yet written to disk when the writing transaction is finished. After a system crash, changes made by transactions that were not finished must be rolled back and changes by committed transaction must not be lost.

To ensure that committed changes are not lost, redo log information can be written by the logger component 244 whenever a change is made. This information can be written to disk at latest when the transaction ends. The log entries can be persisted in separate log volumes while normal data is written to data volumes. With a redo log, committed changes can be restored even if the corresponding data pages were not written to disk. For undoing uncommitted changes, the persistence layer 112 can use a combination of undo log entries (from one or more logs) and shadow paging.

The persistence interface 202 can handle read and write requests of stores (e.g., in-memory stores, etc.). The persistence interface 202 can also provide write methods for writing data both with logging and without logging. If the logged write operations are used, the persistence interface 202 invokes the logger 244. In addition, the logger 244 provides an interface that allows stores (e.g., in-memory stores, etc.) to directly add log entries into a log queue. The logger interface also provides methods to request that log entries in the in-memory log queue are flushed to disk.

Log entries contain a log sequence number, the type of the log entry and the identifier of the transaction. Depending on the operation type additional information is logged by the logger 244. For an entry of type "update", for example, this would be the identification of the affected record and the after image of the modified data.

When the data application 104 is restarted, the log entries need to be processed. To speed up this process the redo log is not always processed from the beginning. Instead, as stated above, savepoints can be periodically performed that write all changes to disk that were made (e.g., in memory, etc.) since the last savepoint. When starting up the system, only the logs created after the last savepoint need to be processed. After the next backup operation the old log entries before the savepoint position can be removed.

When the logger 244 is invoked for writing log entries, it does not immediately write to disk. Instead it can put the log entries into a log queue in memory. The entries in the log queue can be written to disk at the latest when the corresponding transaction is finished (committed or aborted). To guarantee that the committed changes are not lost, the commit operation is not successfully finished before the corresponding log entries are flushed to disk. Writing log queue entries to disk can also be triggered by other events, for example when log queue pages are full or when a savepoint is performed.

With the current subject matter, the logger 244 can write a database log (or simply referred to herein as a "log") sequentially into a memory buffer in natural order (e.g., sequential order, etc.). If several physical hard disks/storage devices are used to store log data, several log partitions can be defined. Thereafter, the logger 244 (which as stated above acts to generate and organize log data) can load-balance writing to log buffers over all available log partitions. In some cases, the load-balancing is according to a round-robin distributions scheme in which various writing operations are directed to log buffers in a sequential and continuous manner. With this arrangement, log buffers written to a single log segment of a particular partition of a multi-partition log are not consecutive. However, the log buffers can be reordered from log segments of all partitions during recovery to the proper order.

As stated above, the data storage application 104 can use shadow paging so that the savepoint manager 216 can write a transactionally-consistent savepoint. With such an arrangement, a data backup comprises a copy of all data pages contained in a particular savepoint, which was done as the first step of the data backup process. The current subject matter can be also applied to other types of data page storage.

The data storage application 104 can utilize multi-version concurrent control (MVCC) for transaction isolation and consistent reading. Each row of the database can be associated with a unique, monotonically-increasing identifier (RowID). When a new version of the record is created, this new version can also become a new RowID (i.e., due to MVCC semantics, old versions must be kept for parallel readers and will be cleaned only during garbage collection after commit).

References herein to pages can refer to pages of a table stored in memory of an in-memory database forming part of the data storage application 104. With the MVCC-based database table implementation, all internal transient data objects of a table can be versioned. These data objects can include table a header object, metadata object(s), other internal state(s) such as vector of loaded pages, dictionary hashes/trees for compressed columnar tables, and the like. In addition, all table control structures used by readers can be versioned. These structures include, for example, page lists, value indirection vectors, internal metadata, and more. Readers do not acquire any locks on data structure, but rather, work with a current version of a data structure until query or query plan operator ends. With this arrangement, old versions only remain for a short period of time (e.g., sub-seconds). As versioned objects are typically small, memory overhead is also small. In addition, even with OLTP systems, incompatible changes are rare (i.e., there are not many concurrent versions, etc.). Moreover, with some implementations, if older versions of prioritized/big objects (e.g., main part of a columnar table, etc.) still exist, no new version of the corresponding object can be created. For example, if there is a reader doing a scan on the main part of a columnar table, which started during columnar table merge from version n−1 to version n, this scan uses main part in version n−1. Even after merge to version n is finished, further merge from version n to version n+1 will be prevented as long as there are any scans running on main part in version n−1 (as this might increase memory demand prohibitively).

Figure 3:
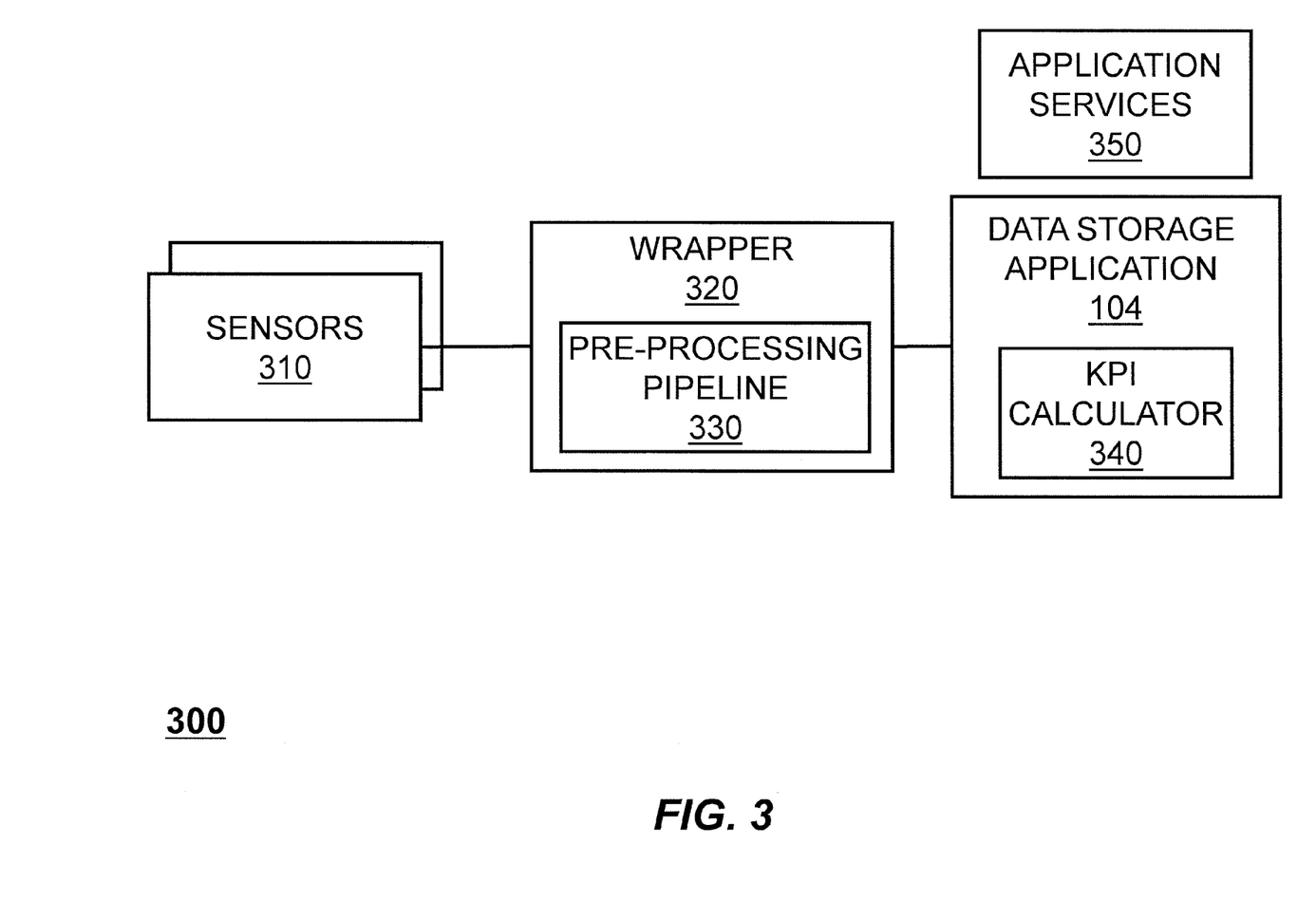
FIG. 3 is a diagram illustrating a sensor pre-processing pipeline.

With reference to diagram 300 of FIG. 3, data derived from a plurality of sensors 310 can be fed, via a wrapper 320 (e.g., a PYTHON wrapper) into a pre-processing pipeline module 330. The pre-processing module 340 can process the data in such a fashion so that it can be written and used by the data storage application 104. Once the data is made compatible/usable by the data storage application 104, various analytics can be executed using a key performance indicator (KPI) module 340. The KPI module 340 can be accessed for real-time analytics via an application services server 350. The data storage application 104 can be the SAP HANA real-time data platform and the application services server 350 can, for example, execute SAP HANA Extended Application Services (XS).

Figure 4:
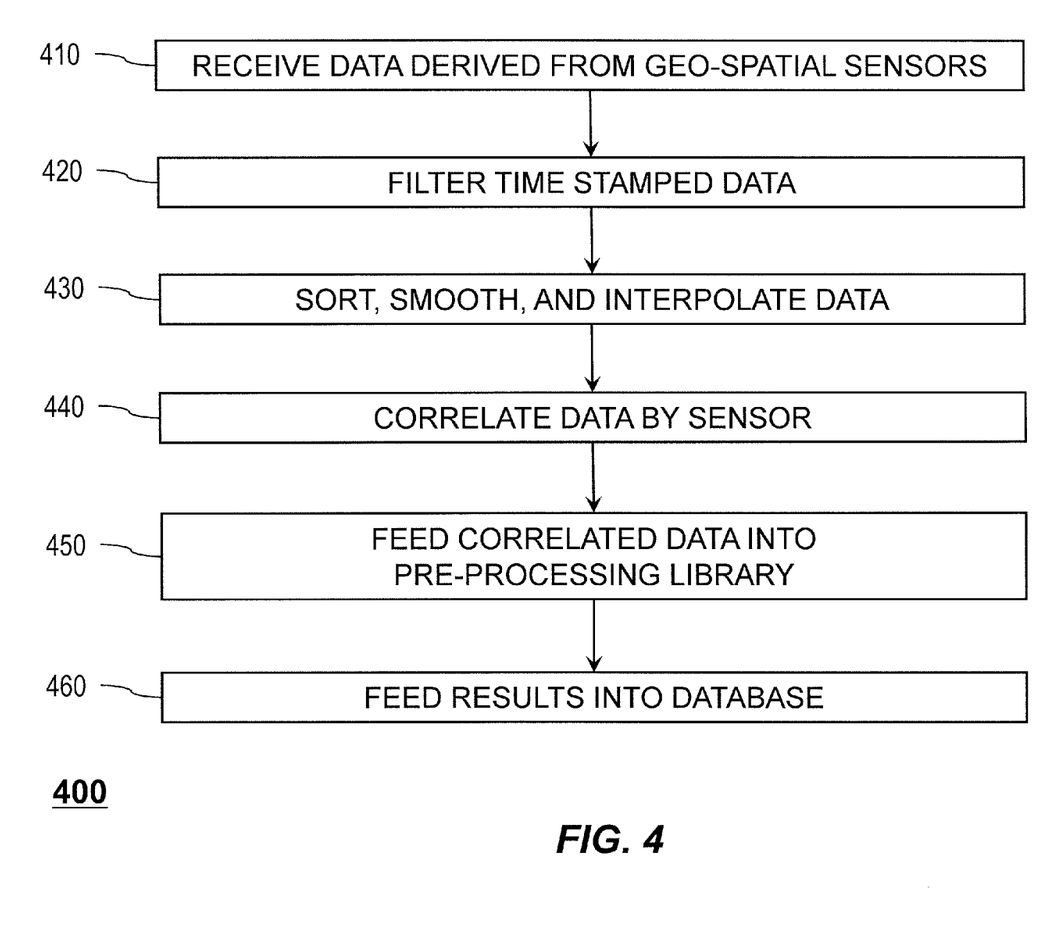
FIG. 4 is a first process flow diagram illustrating pre-processing of geo-spatial sensor data for use by a data storage application.

With reference to process flow diagram 400 of FIG. 4, data is received, at 410, that is derived from a plurality of geo-spatial sensors that respectively generate data characterizing a plurality of sources (e.g., athletes, etc.) within a zone of interest (e.g., playing field boundaries, etc.). The data comprises series time-stamped frames for each of the sensors with at least one of the sources having two or more associated sensors. Thereafter, at 420, frames having time stamps from the future (as defined below) are filtered. In order to effect such filtering, a system time as well as a time of a first sample for a particular sensor are recorded so that an expected value for a timestamp for arriving frames for the sensor can be computed. Samples having timestamps outside a pre-defined time window (e.g., 5 seconds before or after) relative to the expected value can be discarded.

After the filtering, at 430, data from each sensor can be sorted, smoothed, and interpolated using a sliding window. In particular, a time bar can be subdivided into buckets according to a given sample rate (i.e., the rate at which measurements are generated by/received from the sensors). Each filtered sample can then be assigned to its corresponding bucket. If an amount of time between two valid sensor values spans multiple buckets, missing values can be interpolated (e.g., interpolated linearly). For each bucket with minimal time, time window averages are computed for each bucket for each sensor. Such buckets are referred to herein as "render buckets."

Data from multiple sensors that are associated with a single source can also, at 440, be correlated. For example, with the example of athletics related sensors, a player can have multiple sensors attached to him/her such as at their center body and one or more sensors on each limb. The smoothed and interpolated sensor data for the render bucket can be assigned to a source entity using a mapping provided by the data storage application 104. This mapping can be stored in a table that identified which sensor was active during a training/recording, to which source/object (e.g., player) the sensor was attached and to which limb the sensor was attached. This latter process is sometimes referred to herein as "transposition."

Data can then, at 450, be fed into a pre-processing library and processed. In one implementation, a shared library written in C++ can be used to perform pre-processing. Data can be fed from the synchronization and transposition stage into the library via a Python wrapper. The library can be used to compute various KPIs (e.g. distance, ball contacts) to characterize the actions of the athletes and/or other objects within the zone of interest. Finally, at 460, the results can be written into the data storage application 104.

The pre-processing pipeline 330 can be queried via an interface to produce event information ("Ball has been kicked", "Player left field", etc.) for each frame and each object. The information is used to enrich the individual samples before writing them to the database.

Before data can be added to the pre-processing library, all objects have to be added. In this regard, objects refer to any physical object or boundary within the zone of interest such as players, balls and beacons marking the playing field boundaries and goals. The beacons (also sometimes referred to as cones or pins) can also be used to mark training objects (e.g., obstacles that the players have to run around, etc).

Field boundaries and goal lines can be added as moving objects of type PIN or as fixed geometries. Data can be fed into the pre-processor via a C shared library interface. For each frame, samples for all objects are added, and then processing of that frame can be triggered. Such an arrangement can enable contextual analysis of game play by characterizing the training environment in which the objects move. This training environment includes the field boundaries and the goal post positions. The playing area is typically a rectangle but could also be an arbitrary polygon. The goals can be denoted by two points (one for each post), and in some cases, an elevation point can be denoted (corresponding to the height of the goal).

There can be two ways of specifying field outlines and goal positions to the application. A first technique is to statically configure them in a database table (called field) before analyzing a training session. The other technique is to place beacons (cones with sensors, sometimes called pins) at those positions and then configure the application to know e.g. "beacon 112 is the left upper corner of the field" or "beacon 114 is the left goal post of the left goal"). This arrangement allows for the field to dynamically change during the training (e.g. when a player accidentally stumbles over a field delimiting beacon and changes its position, etc.).

Once the data has been persisted in the data storage application 104, as described above, the data can then be processed. With reference to diagram 500 of FIG. 5, such data processing can comprise three distinct phases, initialization 510, object-local processing 520, and global processing 530. During the initialization phase 510, geographical boundaries for the zone of interest and elements of interest (i.e., sensor sources, etc.) can be updated. For sport applications such as soccer, the geographical boundaries can comprise the boundaries of the playing field and the elements of interest can include the goal line, center line, and the like. Again, while the following is described predominantly in relation to soccer (a/k/a football), it will be appreciated that the processing The object-local processing phase 520 relates to computing distance, velocities, and acceleration for the sources corresponding to the sensors. In addition, conversion of three dimensional input data can be handled automatically to fewer dimensions. For example, the input data can be transformed into velocity-state information for the source (e.g., standing, running, sprinting) and acceleration-state information (low/high acceleration, soft/hard kicking, etc.). The state information can be computed using state machines to prevent flickering of frames during state transitions. In this approach, ranges of velocities are modeled as intervals (e.g. 0-1 km/h is a state called "stand", 1-11 km/h is called "trot", values exceeding 24 km/h are called "sprint"). These values can either be predefined by the system or be freely configured by the user. In the latter case, they can either be pre-defined before recording the game in order to receive live information, or they can be set/changed afterwards to perform different kinds of analysis. When changing states, a player will usually not do so linearly but will do so with a certain amount of noise, e.g. the velocity during a transition from high speed to sprint might be like 19.8, 22.7, 24.1, 23.4, 24.4, 25.3, 26.2. The player hereby crosses the 24 km/h limit twice, but only after the second time continues to accelerate well above the limit. If crossing the 24 km/h boundary was the only criterion then this would count as two sprints. Hence, the state transition can last for a minimum number of frames before entering the new state, e.g. three frames. In one implementation, velocities persisted in the data storage application 104 can be analyzed based on an objects relation to other objects (having sensors affixed thereto). For example, whether a player currently controls the ball or not ("sprint with ball, sprint w/o ball"). In addition, velocities can be analyzed based on whether an opponent is near the player ("sprint ability diminished by opponent"). Acceleration of the players can be analyzed accordingly, e.g. by discerning and displaying to the user the number of times a player accelerated or decelerated above a certain limit.

Figure 5:
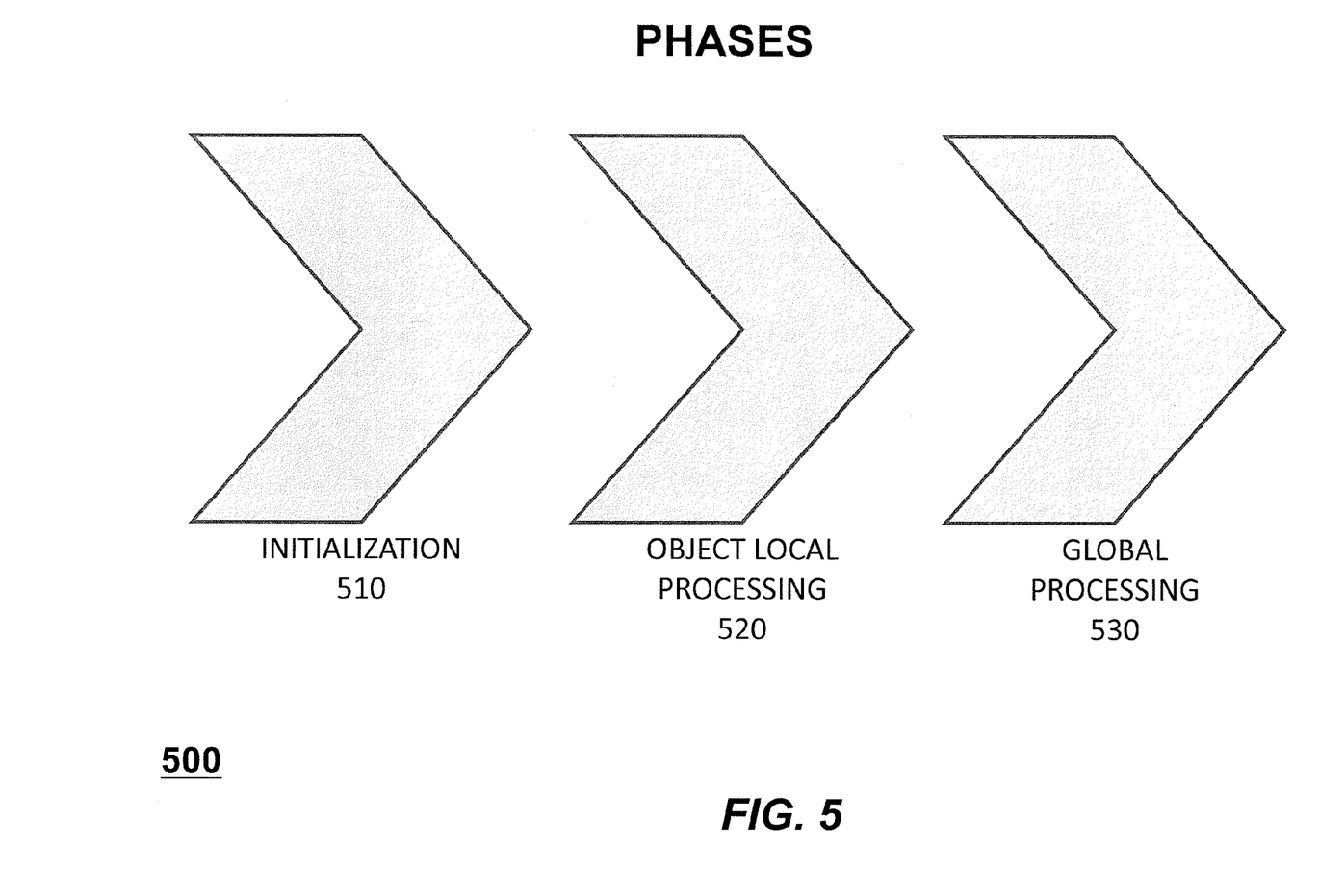
FIG. 5 is a diagram illustrating three phase data processing.

The global processing phase 520 can determine various factors amongst the sources being monitored such as, for example in relation to soccer, the active ball, ball contacts, coverage of opponents, goals and kicks in the goals direction. The active ball can be the ball which is closest to a player. To become the active ball, a ball has to be closer to any player than all other balls for more than a pre-defined threshold (e.g., 90 frames=2.7 sec). The proximity of the ball to the field boundaries can also be considered to determine the active ball. This prevents thrashing of the active ball. During training, a team often has approximately 10 balls on the field. Usually most of them reside inside one of the goals behind the goal line. When a ball leaves the field or a goal is scored, one of the keepers or the trainer quickly throw another ball into the game in order to keep the players busy and now to have the breaks take time to fetch the ball. This is why there are usually multiple balls in the proximity of the field and sometimes more than one ball is inside the field boundaries, e.g. when one failed pass is still rolling towards the field boundary while the game already continued with another ball. Also trainers carry the balls around and sometimes accidentally more than one ball is being actively used. The active ball is flagged in a separate column.

Ball contact can be detected when the ball experiences at least a soft kick (which can be determined by one or more sensors within or otherwise associated with the ball). A ball can be considered as being kicked by a player, if a sensor of that player is closer to the ball than all other players' sensors and if the distance if less than a pre-defined threshold (e.g., 1 m, etc.) to the ball prior to the ball moving in a manner consistent with a kick. Otherwise no kick is detected as having occurred. In some variations, ball contacts can only happen, if the ball is inside the field (i.e., the zone of interest).

Figure 6:
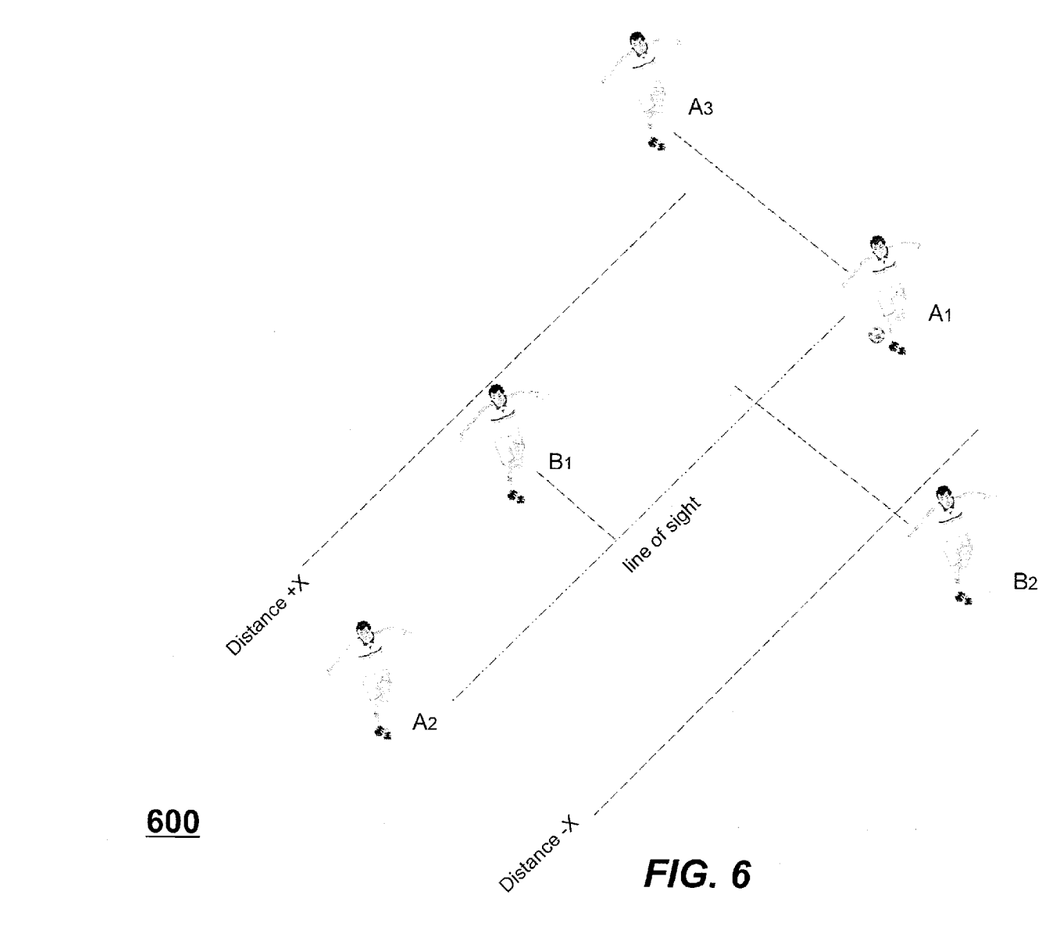
FIG. 6 is a first diagram illustrating coverage of at least one player of a first team by at least one second player of a second team.

The geo-spatial data derived from the sensors on each player and the ball can be used to identify various aspects including, for example, player coverage. With this example, player coverage can be computed for all players of the team that currently possesses the ball (as can be determined by associating the active ball with one or players of a certain team for a pre-defined time period). With reference to diagram 600 of FIG. 6, in one variation, a player can be considered to be covered if there is an opponent less than a pre-defined distance (e.g., 1 m, etc.) away from the line of sight between the player and the team member controlling the ball. In FIG. 6, a center line of sight is visualized extending from player $A_1$ to player $A_2$. In this case, player $A_1$ has the ball, $A_2$ is covered by player $B_1$ (because the player $B_1$ is within the pre-defined distance away from the line of sight) but not by player $B_2$, and player $A_3$ is not covered. As the player in possession of the ball has to be able to pass it on, the coverage, in some cases, is only computed if the ball is closer than a pre-defined distance (e.g., 2 m, etc.) to the player in possession of the ball. Coverage, as calculated herein, can be used to determine how hard a player should kick a ball when passing to another player so that it cannot be intercepted by the opposing team.

Figure 7:
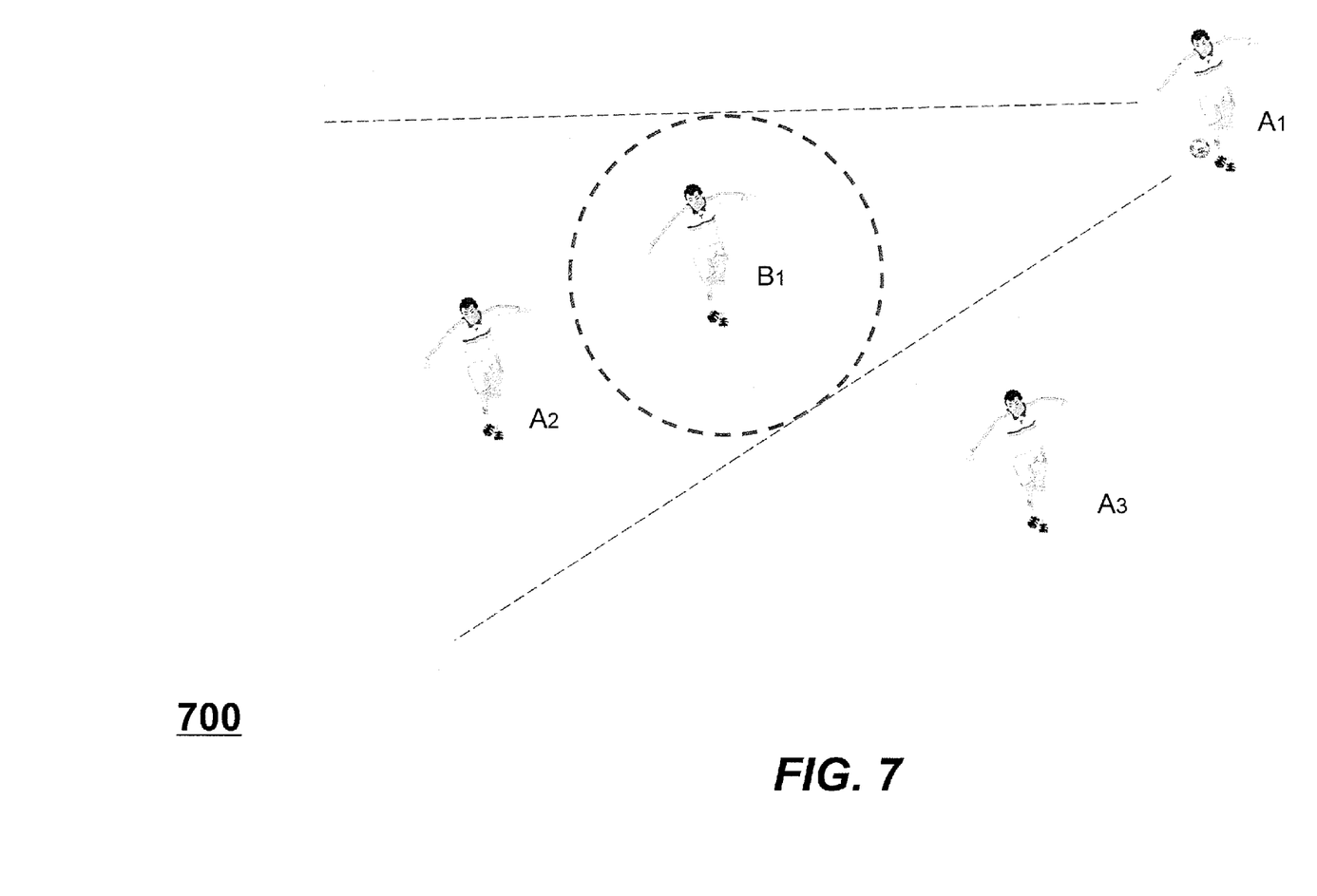
FIG. 7 is a second diagram illustrating coverage of at least one player of a first team by at least one second player of a second team.
Figure 8:
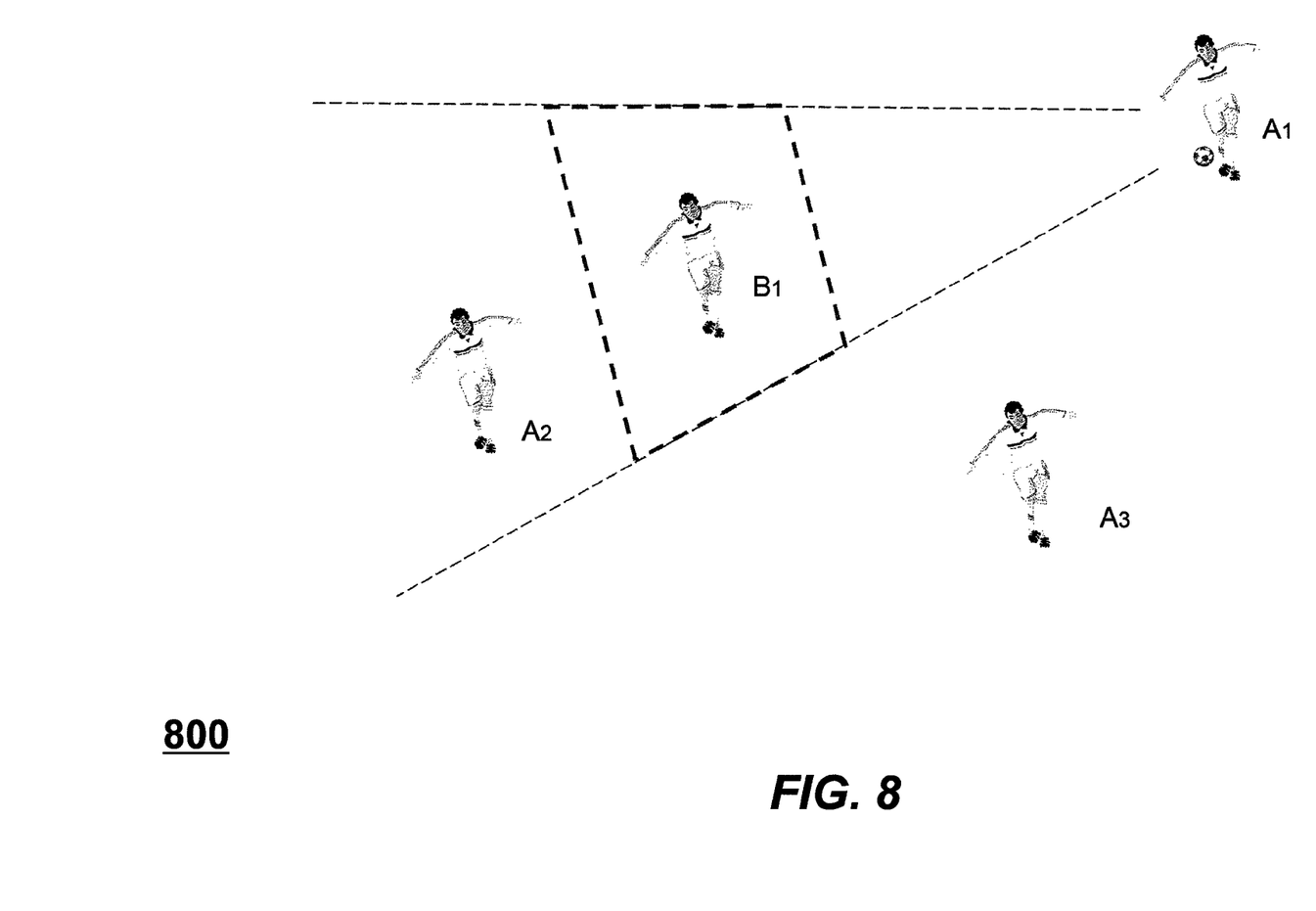
FIG. 8 is a third diagram illustrating coverage of at least one player of a first team by at least one second player of a second team.
Figure 9:
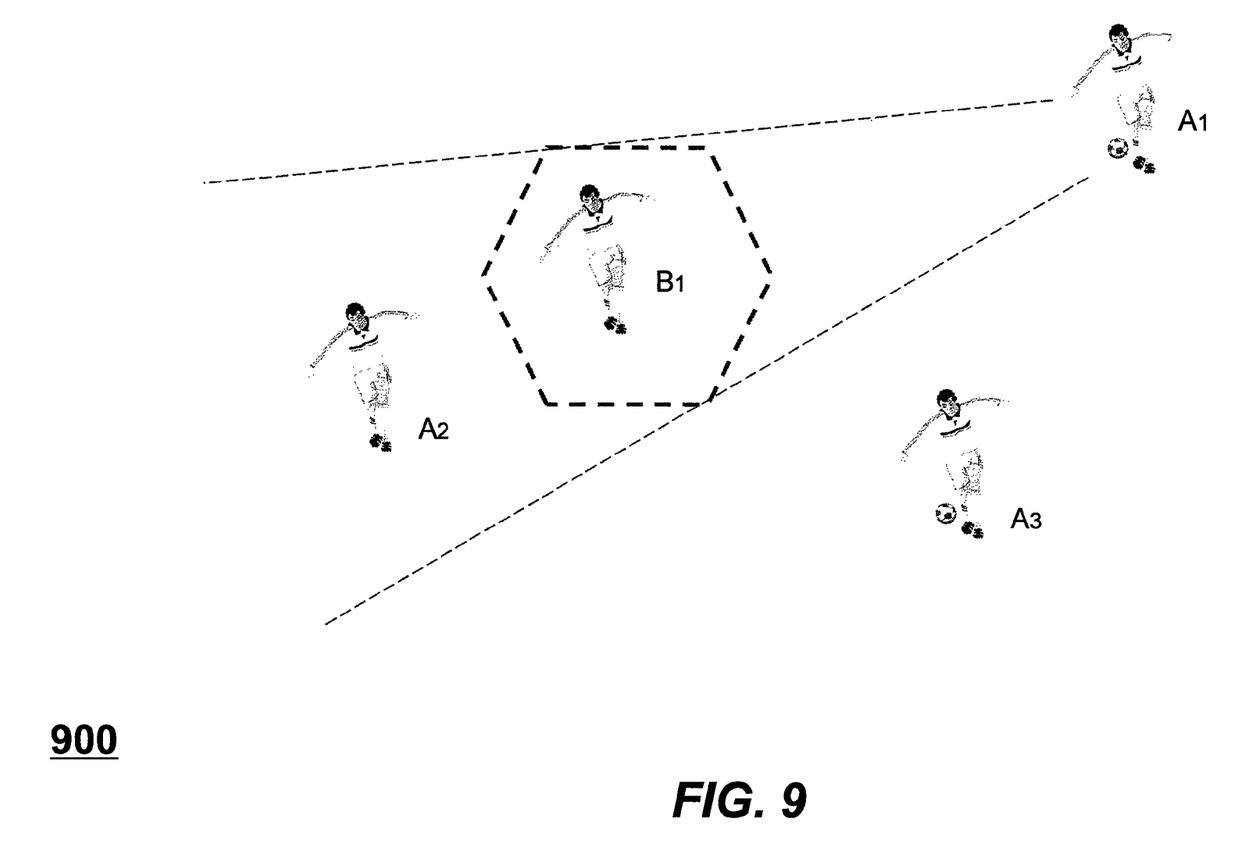
FIG. 9 is a fourth diagram illustrating coverage of at least one player of a first team by at least one second player of a second team.

With reference to diagram 700 of FIG. 7, coverage, as calculated herein, can also be used to determine shadowing by the covering player. In this example, Player $A_1$ has the ball, player $A_2$ is covered by player $B_1$, player $A_3$ is not covered. This determination can be determined by first calculating a potential passing zone (indicated by the angled dashed lines), a radius of possible movement for player $B_1$ (indicated by the dashed circular member)—or rather a convex hull associated with player $B_1$. With the latter arrangement, the convex hull can be calculated by ray-casting relative to the player with the ball. For example, in diagram 800 of FIG. 8, the convex hull is a trapezoidal shape while in diagram 900 of FIG. 9, the convex hull is in a different polygonal shape (in this case a hexagon). The hull surrounding the covering player (of the team who doesn't control the ball) can also be computed by taking into account the velocity of the player and the direction in which he currently moves. This can be accomplished by assuming a base shape (circle, polygon) and warping it, e.g. into the direction of movement, under the assumption that the players reach in direction of his current movement is greater than in opposite direction where he'd first have to stop.

In some variations, coverage can be determined by additionally modelling the interaction during a pass play from players $A_1$ to $A_2$. For example, the ball's velocity will decrease after being kicked until either reaching player $A_2$ or coming to a rest. The velocity will first rise to a peak value depending on the kick intensity before decreasing. The exact parameters of the decrease depend on environmental influences such as the ball's shape, weight, material, the grass' height, moisture, wind, and so on. However, generally speaking, velocity decreases over time.

Figure 10:
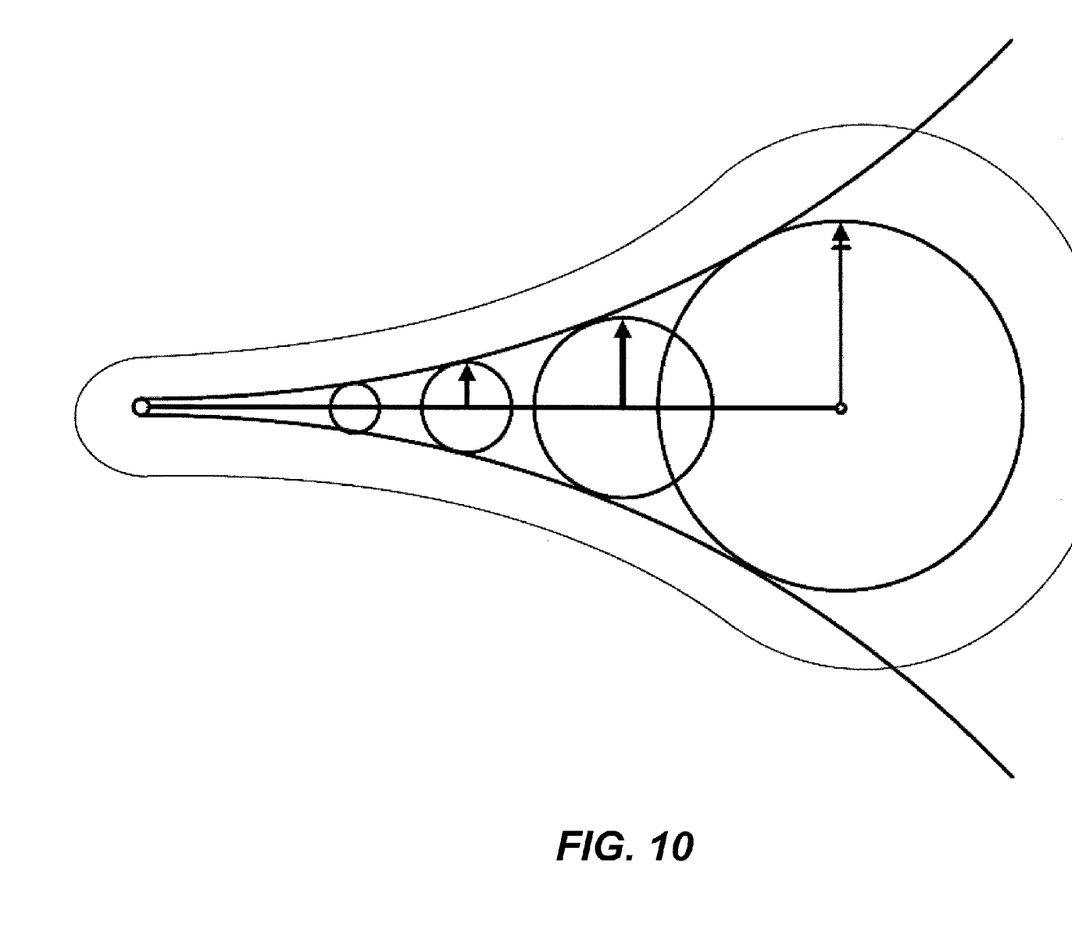
FIG. 10 is a diagram illustrating an outer boundary of coverage of at least one player of a first team by at least one second player of a second team.

The point in time at which the ball will reach a given distance from the passing player will increase with the distance (however this is non-linear). Therefore, an opponent has more time to approach the line of sight between player $A_1$ and player $A_2$ and intercept the pass. With reference to diagram 1000 of FIG. 10, by defining a circle around each position of the ball with a radius of the distance, an opponent can run to intercept the ball until the ball arrives there. As such, there can be a sequence of circles that define an area inside of which an opponent has the chance to intercept the ball. Allowing for a margin of instantaneous leg movements, one can end up with an outer boundary in which an opponent covers the potential receiver of a pass. After such an outer boundary is defined, a minimum required kick intensity can be determined (for any particular real-time scenario) for a player to pass the ball without it being intercepted.

With the current subject matter, goals can be detected when the sensor on the ball is determined to cross a goal line in a particular frame. In addition, goals can be set at arbitrary points in the playing field, as is common, for example, during children's soccer where the goals are placed in the middle of the field or during scrimmages.

Goal kick information can be computed each time the ball is kicked, by considering of velocity, angle and distance to the goal lines. For each kick, the kick velocity, distance to the goal-line and offset by which the ball will miss the goal, can be computed. For example, the computation can be used to determine that the kick happened 10 m away from the goal with 30 m/sec and the ball will miss the goal by 3 m. As another example, it can be detect that the ball was kicked in direction of the goal 70 m away with 5 m/sec and, it can be calculated that the ball will miss the goal by 300 m. In some variations, rules can be defined to determine whether each particular kick will be considered a goal kick. Missing the goal by 3 m will likely be characterized as a goal kick while missing the goal by 300 m will likely not be characterized as a goal kick. In some variations, the user can specify the rules for determining when to consider a particular kick as being a goal kick. Goal kick detection can be performed after a pre-defined threshold, for example, 200 ms after the ball has been kicked to allow for the ball's speed vector to build up.

Figure 11:
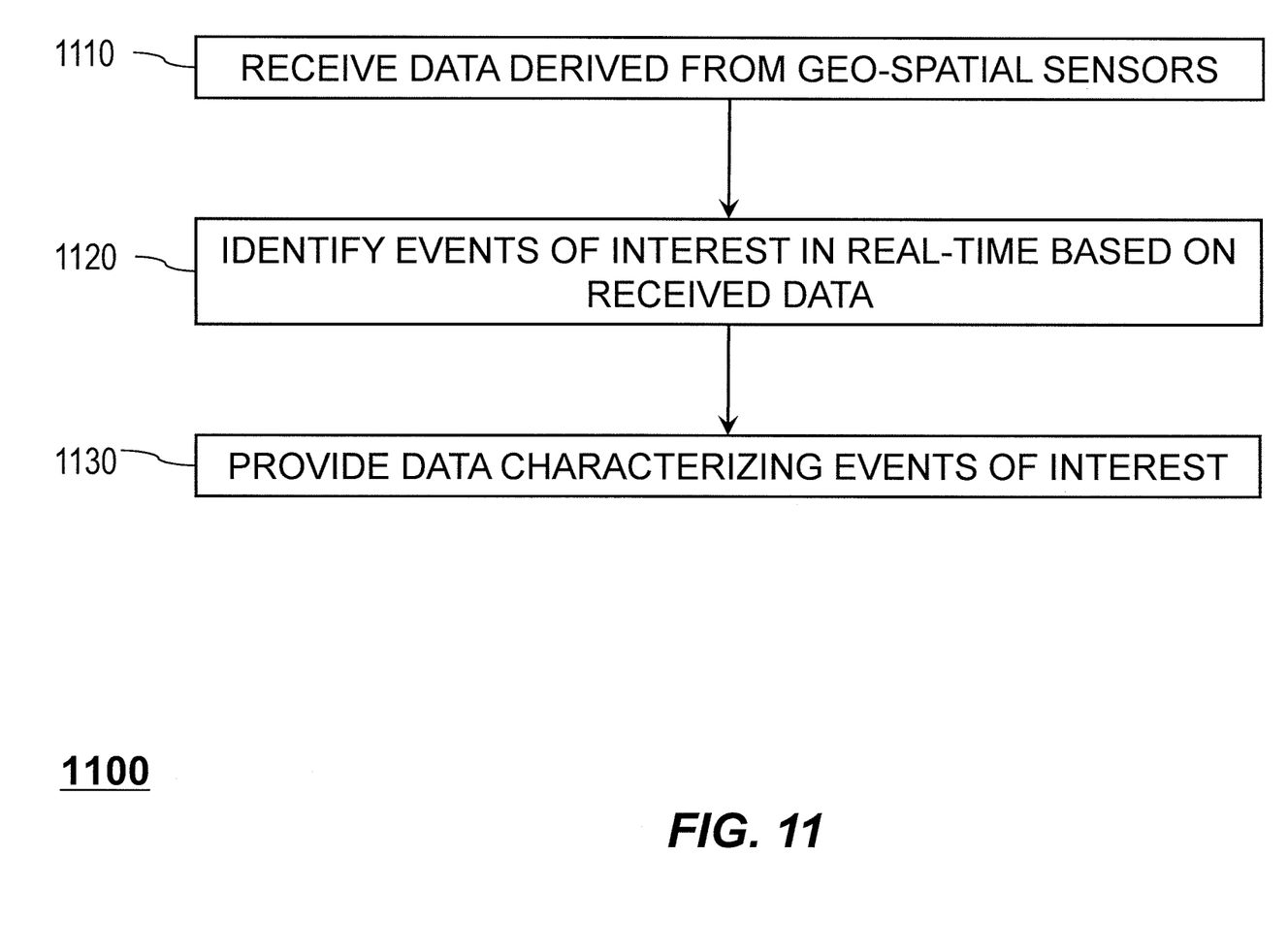
FIG. 11 is a process flow diagram for identify events of interest in real-time.

FIG. 11 is a process flow diagram that illustrates a method 1100 in which at, 1110, correlated and processed data is received that is derived from a plurality of geo-spatial sensors that respectively generate data characterizing a plurality of sources within a zone of interest. The data includes a series of time-stamped frames for each of the sensors with, some variations, at least one of the sources having two or more associated sensors. Thereafter, at 1120, events of interest are identified in real time based on relative positions of the sources within the zone of interest prior to the data being written to a data storage application. Subsequently, at 1130, data is provided (e.g., displayed, stored, loaded into memory, transmitted to a remote system, etc.) that characterize the events of interest.

One or more aspects or features of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device (e.g., mouse, touch screen, etc.), and at least one output device.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" (sometimes referred to as a computer program product) refers to physically embodied apparatus and/or device, such as for example magnetic discs, optical disks, memory, and Programmable Logic Devices (PLDs), used to provide machine instructions and/or data to a programmable data processor, including a machine-readable medium that receives machine instructions as a machine-readable signal. The term "machine-readable signal" refers to any signal used to provide machine instructions and/or data to a programmable data processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flow(s) depicted in the accompanying figures and/or described herein do not necessarily require the particular order shown, or sequential order, to achieve desirable results. Other implementations may be within the scope of the following claims.

What is claimed is:

1. A method comprising:
   receiving correlated and processed data derived from a plurality of geo-spatial sensors that respectively generate data characterizing a plurality of sources within a zone of interest, the data comprising a series of time-stamped frames for each of the sensors, and the plurality of sources including a ball;
   detecting, in real-time, occurrences of one or more events of interest based on relative positions of the plurality of sources within the zone of interest, the detecting being performed prior to the data being written to a data storage application, the one or more events of interest including an attempt at a goal, and wherein the detecting of an attempt at the goal includes computing, based on the relative positions of the plurality of sources within the zone of interest, an offset between a trajectory of the ball and the goal; and
   providing, in real-time, data characterizing the one or more events of interest.

2. A method as in claim 1, wherein the plurality of sources further comprises one or more athletes.

3. A method as in claim further comprising:
   determining, based at least on a distance between the ball and the one or more athletes, that the ball is active.

4. A method as in claim 3, further comprising:
   determining, based at least on an athlete of the one or more athletes that is closest to the ball, a team having possession of the ball.

5. A method as in claim 1, wherein the one or more events of interest further include one or more goals.

6. A method as in claim 1, wherein the one or more events of interest further include one or more passes between a first player and a second player.

7. A method as in claim 6, wherein the one or more events of interest further include an interception of the ball from a first player from a first team by second a player from a second team.

8. A method as in claim 1, wherein the one or more events of interest further include a first player on a first team covering a second player on a second team.

9. A method as in claim 8, further comprising:
   determining an outer boundary of coverage of the first player in relation to the second player.

10. A method as in claim 1, wherein the data storage application comprises an in-memory database.

11. A method as in claim 10, wherein the in-memory database comprises a columnar data store storing data in a columnwise-fashion.

12. A method as in claim 1, wherein the receiving, identifying, and processing, are implemented by at least one data processor forming part of at least one computing system.

13. A method as in claim 1, wherein an athletic event comprises the one or more events of interest.

14. A method as in claim 1, wherein an attempt at the goal is detected when the offset between the trajectory of the ball and the goal does not exceed a threshold value.

15. A non-transitory computer program product storing instructions which, when executed by at least one data processor forming part of at least one computing system, result in operations comprising:
   receiving correlated and processed data derived from a plurality of geo-spatial sensors that respectively generate data characterizing a plurality of sources within a zone of interest, the data comprising a series of time-stamped frames for each of the sensors, and the plurality of sources including a ball;
   detecting, in real-time, occurrences of one or more events of interest based on relative positions of the plurality of sources within the zone of interest, the detecting being performed prior to the data being written to a data storage application, the one or more events of interest including an attempt at a goal, and wherein the detecting of an attempt at the goal includes computing, based on the relative positions of the plurality of sources within the zone of interest, an offset between a trajectory of the ball and the goal; and providing, in real-time, data characterizing the one or more events of interest.

16. A computer program product as in claim 15, further comprising determining, based at least on a distance between the ball and one or more athletes, that the ball is active; and determining, based at least on an athlete of the one or more athletes that is closest to the ball, a team having possession of the ball.

17. A computer program product as in claim 15, wherein the one or more events of interest further include one or more goals.

18. A system comprising:

an in-memory database comprising a columnar data store storing data in a columnwise-fashion;

at least one data processor; and memory storing instructions which, when executed by the at least one data processor, result in operations comprising:

receiving correlated and processed data derived from a plurality of geo-spatial sensors that respectively generate data characterizing a plurality of sources within a zone of interest, the data comprising a series of time-stamped frames for each of the sensors, and the plurality of sources including a ball;

detecting, in real-time, occurrences of one or more events of interest based on relative positions of the plurality of sources within the zone of interest, the detecting being performed prior to the data being written to in-memory database, the one or more events of interest including an attempt at a goal, and wherein the detecting of an attempt at the goal includes computing, based on the relative positions of the plurality of sources within the zone of interest, an offset between a trajectory of the ball and the goal; and providing, in real-time, data characterizing the events of interest.

\* \* \* \* \*